United States Patent
Kopp

(10) Patent No.: US 8,714,019 B2
(45) Date of Patent: May 6, 2014

(54) MEASURING CELL WITH A CASING FOR HOUSING A SENSOR, IN PARTICULAR A PRESSURE TRANSDUCER

(75) Inventor: Thomas Kopp, Wolfach (DE)

(73) Assignee: Vega Greishaber KG, Wolfach (DE)

( * ) Notice: Subject to any disclaimer, the term of this patent is extended or adjusted under 35 U.S.C. 154(b) by 205 days.

(21) Appl. No.: 13/325,788

(22) Filed: Dec. 14, 2011

(65) Prior Publication Data

US 2012/0260738 A1 Oct. 18, 2012

Related U.S. Application Data

(63) Continuation of application No. 61/477,411, filed on Apr. 20, 2011.

(30) Foreign Application Priority Data

Apr. 13, 2011 (EP) .................................. 11003117

(51) Int. Cl.
*G01L 19/04* (2006.01)
*G01L 7/00* (2006.01)

(52) U.S. Cl.
USPC .................................. 73/708; 73/700; 73/756

(58) Field of Classification Search
None
See application file for complete search history.

(56) References Cited

U.S. PATENT DOCUMENTS

| | | | |
|---|---|---|---|
| 3,402,690 A * | 9/1968 | Willis | 116/220 |
| 4,970,898 A * | 11/1990 | Walish et al. | 73/706 |
| 4,993,266 A * | 2/1991 | Omura et al. | 73/720 |
| 5,315,875 A * | 5/1994 | Benedikt et al. | 73/706 |
| 5,402,683 A * | 4/1995 | Kosugi et al. | 73/756 |
| 5,703,282 A * | 12/1997 | Kuesell et al. | 73/114.18 |
| 5,712,424 A * | 1/1998 | Reed | 73/114.16 |
| 6,209,399 B1 * | 4/2001 | Probst et al. | 73/756 |
| 6,715,360 B1 | 4/2004 | Pepperling et al. | |
| 7,464,604 B2 * | 12/2008 | Takeuchi et al. | 73/756 |
| 7,856,890 B2 * | 12/2010 | Matsui et al. | 73/850 |
| 8,109,148 B2 * | 2/2012 | Habibi et al. | 73/708 |

FOREIGN PATENT DOCUMENTS

| | | |
|---|---|---|
| DE | 44 07 212 | 8/1995 |
| DE | 10 2007 001 445 | 7/2008 |
| EP | 0 209 495 | 4/1986 |
| EP | 1 471 335 | 3/2004 |

OTHER PUBLICATIONS

EP Search Report, Appln. No. 11003117.6 mailed Sep. 15, 2011, 9 pages—German, 6 pages—English.
EP 11 003 117.6 Office Action mailed Oct. 31, 2013, 9 pages—German, 3 pages—English.

* cited by examiner

*Primary Examiner* — Lisa Caputo
*Assistant Examiner* — Jermaine Jenkins
(74) *Attorney, Agent, or Firm* — Andrew F. Young, Esq.; Lackenbach Siegel, LLP

(57) ABSTRACT

The invention relates to a measuring cell with a casing for housing a sensor, in particular a pressure transducer, in which the casing has a pressure compensation vent for the sensor; and is provided with a sealing element with an axisymmetrical circumferential surface arranged proximate an internal surface of a casing bore formed operably and complementary hereto, and that the pressure compensation vent is formed as at least one gap resistant to ignition flashovers by interaction of a strip-shaped and plane surface section extending along the casing bore on the circumferential surface of the sealing element with the internal surface of the casing bore.

13 Claims, 4 Drawing Sheets

MEASURING CELL WITH A CASING FOR HOUSING A SENSOR, IN PARTICULAR A PRESSURE TRANSDUCER

CROSS REFERENCE TO RELATED APPLICATIONS

This application claims priority from European Patent App. Ser. No. 11 003 117.6 filed Apr. 13, 2011, and from U.S. Ser. No. 61/477,411 filed Apr. 20, 2011, the entire contents of each of which are incorporated herein fully by reference.

FIGURE FOR PUBLICATION

FIG. 3

BACKGROUND OF THE INVENTION

1. Field of the Invention

The present invention relates to a measuring cell with a casing for housing a sensor, in particular a pressure transducer. In particular, the present invention relates to a measuring cell with a casing for housing a sensor, in particular a pressure transducer, in which the casing has a pressure compensation vent for the sensor mounting device 2. Description of the Related Art The related art involves measuring cells, including those known from DE 10 2007 001 445 A1, the entire contents of which are herein incorporated fully by reference.

In metrology it is frequently necessary to operate measuring equipment in potentially explosive environments. To prevent any explosion risk being caused by such measuring units, these are placed into explosion-proof (e.g., "ex-proof") enclosures, where the type of ignition protection is a flameproof enclosure design. In case of an explosion, such enclosure must both withstand the pressure occurring on the inside and prevent the explosion from spreading into the explosive atmosphere which surrounds the enclosure.

These enclosures are normally provided with gaps that are resistant to ignition-flashovers to reduce the high gas pressure that is created inside of a pressure-resistant encapsulated enclosure during an explosion. Such gaps, which normally exist in an enclosure, since cable bushings for measuring signal lines to the outside must also be provided, it is unfortunately a fact that the dimensions must be so tight and of a great length so that a flame of an explosion is extinguished and the temperature of the explosion gases is reduced sufficiently by cooling, so that no ignition can occur in the surrounding atmosphere. These construction requirements provide manufacturing difficulties.

The gap size is specified, depending on the gas composition in the potentially explosive atmosphere, pursuant to the European Standard EN 50 018.

It is also known that to separate zones of potentially explosive areas for an enclosure, a contact bushing for measuring signal lines of a sensor located in the housing must be provided with pressure-proof glass seals with glass-covered metal contacts, wherein pursuant to the standard to be applied, a capillary tube with an inside bore of 0.2 mm and a length of 17 mm was used for pressure equalization. This complex construction is substantial disadvantageous, however, because due to the strict requirements for sealing and absence of cracks in the glass joints, this results in high production costs and high production losses.

In DE 198 26 911 A1, the entire contents of which are incorporated herein by reference, there is described a pressure-resistant flameproof encapsulated enclosure, which has gaps that are resistant to the ignition-flashovers and where the gap surfaces are essentially parallel to each other. These gaps are designed with a stream-splitting device that delimits the interior of the enclosure and projects into it, which projects on its side facing away from the gap of the respective enclosure wall, forms a point, and one side of which extends oblique and merges into the enclosure wall. Such structural design of the gap and the enclosure is also to improve the effect of suppressing the propagation of explosions to the extent that the same degree of safety can also be achieved with larger gap widths or reduced gap lengths.

Accordingly, there is a need for an improved measuring cell with a casing for housing a sensor, in particular a pressure transducer.

ASPECTS AND SUMMARY OF THE INVENTION

An aspect of the present invention is to provide a measuring cell with a casing for housing a sensor, in particular a pressure transducer, in which the casing has a pressure compensation vent for the sensor; and is provided with a sealing element with an axisymmetrical circumferential surface arranged proximate an internal surface of a casing bore formed operably and complementary hereto, and that the pressure compensation vent is formed as at least one gap resistant to ignition flashovers by interaction of a strip-shaped and plane surface section extending along the casing bore on the circumferential surface of the sealing element with the internal surface of the casing bore.

The inventive approach is characterized in that a measuring cell of the type mentioned at the outset, is provided as with a compact shape, in which "ex-zones"(explosion) are separated to comply with the standard (noted above) and which has a gap that is resistant to ignition flashovers, and which can be produced cost-effectively The invention teaches that such measuring cell with a casing for housing a sensor, in particular a pressure transducer, in which the casing has a pressure compensation vent for the sensor is provided that a sealing element within axisymmetrical circumferential surface is arranged in an internal surface of a casing bore formed complementary hereto, and that the pressure compensation vent is formed as at least one gap resistant to ignition flashovers by interaction of a strip-shaped plane surface section extending along the casing bore on the circumferential surface of the sealing element with the internal surface of the casing bore.

Such sealing element with at least one plane surface on the circumferential surface can be produced easily, especially if this sealing element is made of synthetic material.

The gap width, i.e. the distance between this plane surface section and the internal surface of the casing bore can be adjusted easily, since the distance of the plane surface from the axis of symmetry of the sealing element determines this gap width. In this manner, a standard-compliant gap size can be achieved which is smaller or equal to a width of 2 mm. This offers thus a great improvement in both function and effective production.

According to an alternative embodiment of the present invention, there is provided preferably a plane surface section, respectively provided, for forming two diametrically opposed gaps on the circumferential surface.

In another alternative embodiment of the present invention, a clamping device is provided in one embodiment of the invention for holding the sealing element in its sealing position in the casing. The sealing element can be installed easily with such clamping device, wherein the required leak tightness is assured at the same time.

It is particularly advantageous if the sealing element in a refinement of the embodiment is frusto-conically shaped, for the purpose of which it may be prudent to arrange the conically tapering front end of the sealing element on the outside of the casing, so that the sealing element can be inserted from the inside of the casing. In this manner, this frusto-conical shape interacts and self-centers with the clamping device during the insertion of the sealing element into the correspondingly formed internal surface, so that a high bonding quality between the sealing element and the casing is achieved.

Pursuant to another alternative embodiment of the present invention, the clamping device includes a spring element on the inside of the casing, preferably a wave washer to generate a contact force to press the sealing element into the casing bore as well as a retaining element, preferably a snap ring for retaining the spring element. In this manner, in addition to a simple installation of the sealing element, only few components are needed for this as well.

According to another embodiment of the invention, the sealing element is cylindrically shaped, as a result of which its production is substantially simplified. According to this refinement, for its installation in the casing bore on the outside of the casing, a segmented flange is provided on the same, against which the sealing element bears during its insertion from the inside of the casing.

Also with this cylindrically shaped sealing element, the clamping device includes a spring element on the inside of the casing, preferably a wave washer to generate a contact force to press the sealing element into the casing bore as well as a retaining element, preferably a snap ring for retaining the spring element.

Particularly advantageously, pursuant to one alternative embodiment of the present invention, the sealing element can be designed as a media-impervious contact bushing for the penetration of at least one pin connector, in order to use it for transmitting the measuring signals generated by the sensor from the casing interior to the outside. For this purpose, several pin connectors can be combined in one connector strip which at the same time represents the mating part for connecting cables of a sensor. In this manner, very favorable overall production costs can be achieved, because normal commercially available products can be used as the connector strip after suitable adaptation.

The sealing element can be produced particularly cost-effectively, if, according to an alternative refinement of the present invention, it can be produced preferably from a thermoplastic material according to standard IEC 60079-0 Pos. 7.13, in particular from polyphenyline sulfide (PPS), especially by means of injection molding.

The above, and other aspects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
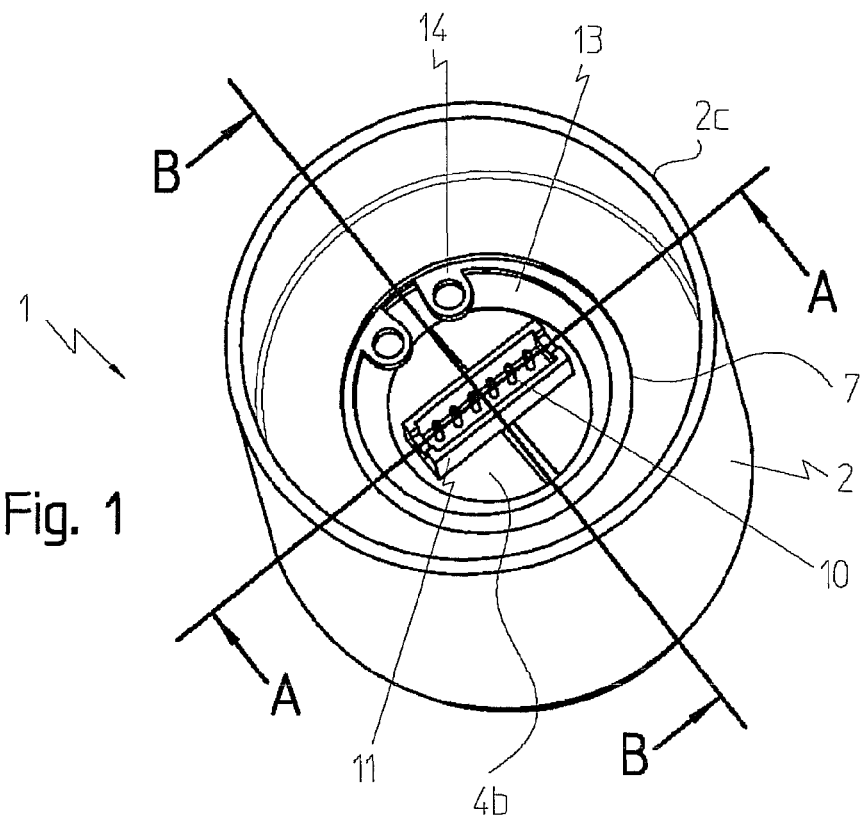
FIG. 1 is a perspective illustration of a casing of a measuring cell with a frusto-conically shaped sealing element pursuant to the invention as an embodiment.

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, up, down, over, above, and below may be used with respect to the drawings. These and similar directional terms should not be construed to limit the scope of the invention in any manner. The words "connect," "couple," and similar terms with their inflectional morphemes do not necessarily denote direct and immediate connections, but also include connections through mediate elements or devices.

Figure 2:
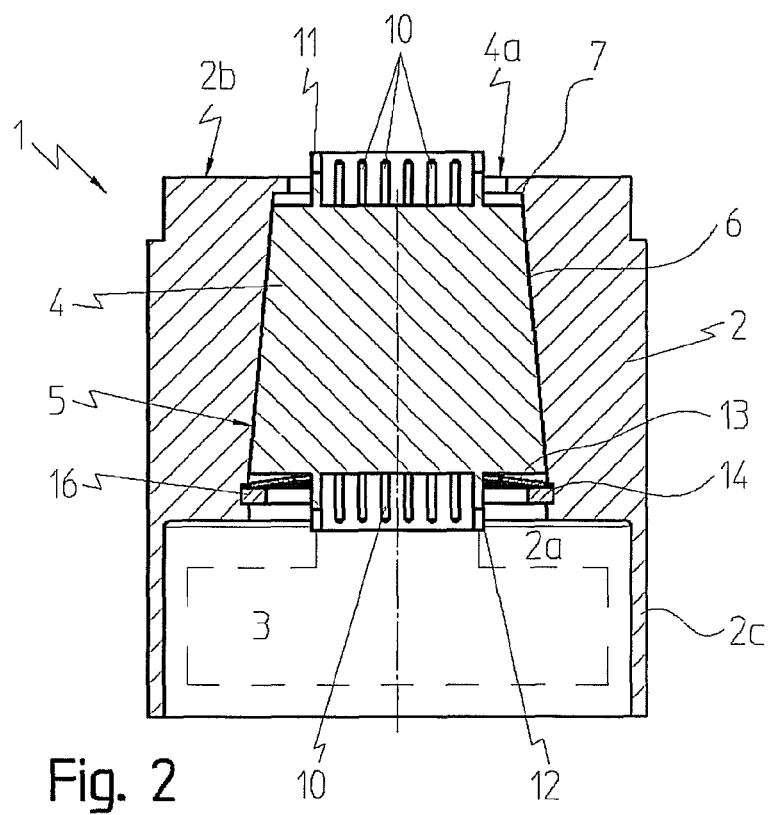
FIG. 2 is a cross-sectional view pursuant to Section A-A according to FIG. 1 with a schematic representation of a pressure transducer.
Figure 3:
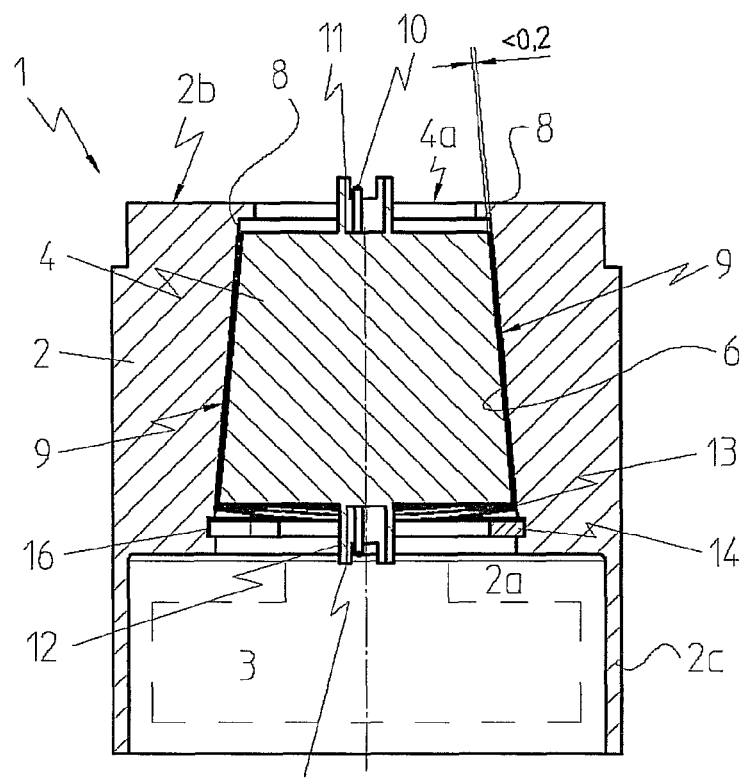
FIG. 3 is a cross-sectional view pursuant to Section B-B according to FIG. 1 with a schematic representation of a pressure transducer.

As will be understood from contemplation of the enclosed, FIGS. 1 to 4 show a measuring cell 1 in different representations, wherein for reasons of clarity, a pressure transducer 3 is merely indicated as a sensor in FIGS. 2 and 3 indicated by dashed lines. This representation is non-limiting but is illustrative of an adaptive use.

Referring now to FIGS. 1 to 4, a measuring cell 1 consists of a hollow cylindrical casing 2 with a frusto-conical shaped casing bore 7, which tapers conically in the direction of a frontal outer surface 2b. A hollow cylindrical casing interior 2a that is radially offset to the outside connects onto this casing bore 7, which is formed by a thin annular wall 2c and accommodates the pressure transducer 3, as shown in the illustrative views of FIGS. 2 and 3. This casing interior 2a is open on the face side, so that the pressure transducer 3 is exposed to a potentially explosive atmosphere, the pressure of which is to be measured.

A frusto-conical sealing element 4 with a front face 4a in the direction of which the sealing element 4 extends as a conical taper, is fitted into the casing bore 7 such that by forming a surface liaison between the frusto-conical circumferential surface 5 of the sealing element 4 and the internal surface 6 of the casing bore 7, this front face 4a is in alignment with the exterior surface 2b on the front face of the casing 2.

In order to hold the sealing element 4 in its assembled position, following the insertion of the sealing element 4 into the casing bore 7, a wave washer 13 is inserted as a spring element into the casing bore 7, so that it bears against the front face 4b of the sealing element 4. A snap ring 14 is clipped into groove 16 which runs around the inner periphery of the casing bore 7, so that the wave washer 13 is thereby pre-tensioned and creates a contact force onto the sealing element 4, pressing it into the casing bore 7, in order to ensure adequate sealing.

Figure 6:
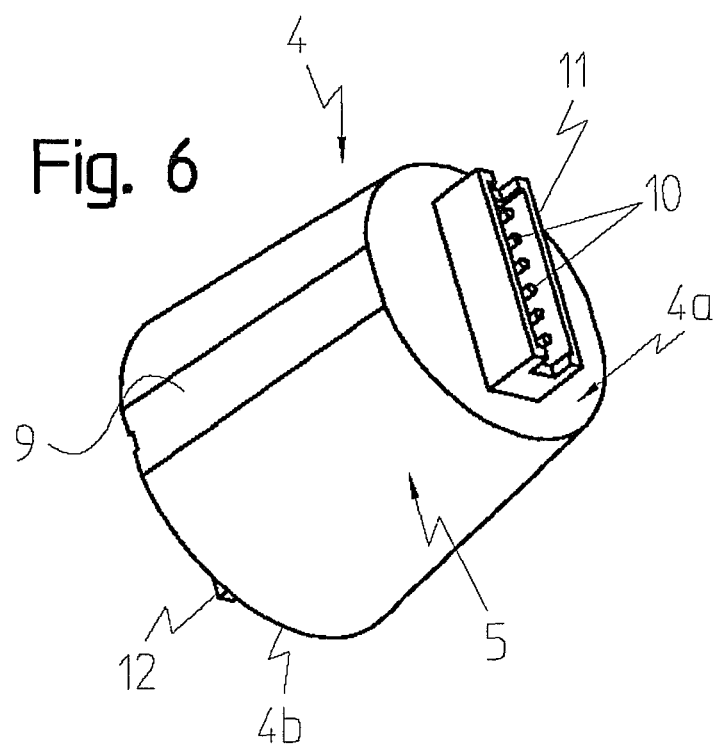
FIG. 6 is a perspective representation of the sealing element of the measuring cell pursuant to FIG. 1.

Now referring to FIG. 6, in this alternative and adaptive view, the sealing element 4 has two opposing strip-shaped and even surface sections 9 (one shown), also called a plane surface hereafter, which respectively extend in the direction of the surface line of the circumferential surface 5. When the sealing element 4 is introduced into the casing bore 7, each plane surface 9 together with the internal surface 6 of the casing bore 7 forms a gap 8 that is resistant against ignition-flashovers, which extends from the casing interior 2a along the casing bore 7 to the outside and at the same time serves as pressure compensation for the pressure transducer 3. It will be understood that while two-opposing strip-shaped surfaces are discussed, one or a plurality may be employed within the scope and spirit of the present invention.

Figure 4:
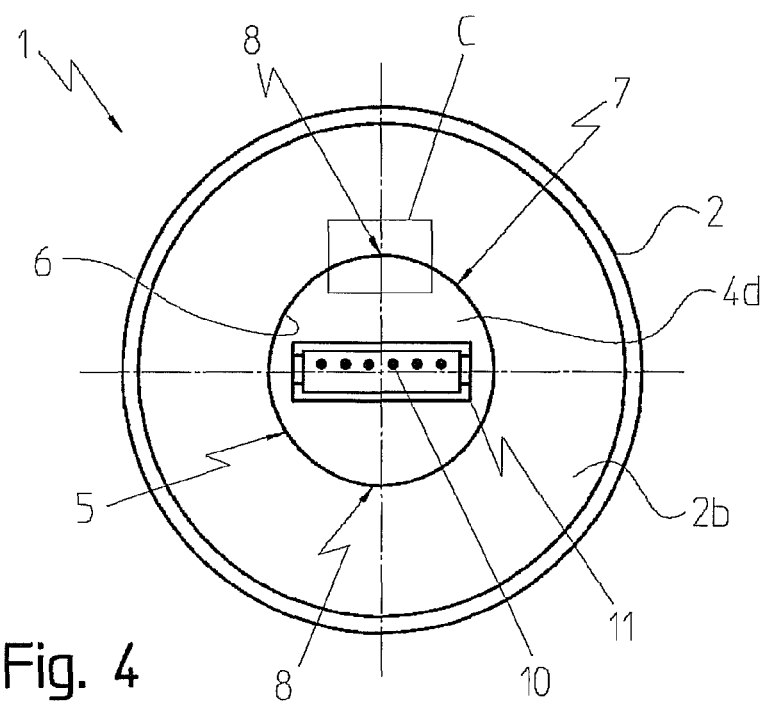
FIG. 4 is a frontal horizontal projection onto the measuring cell pursuant to FIG. 1.
Figure 5:
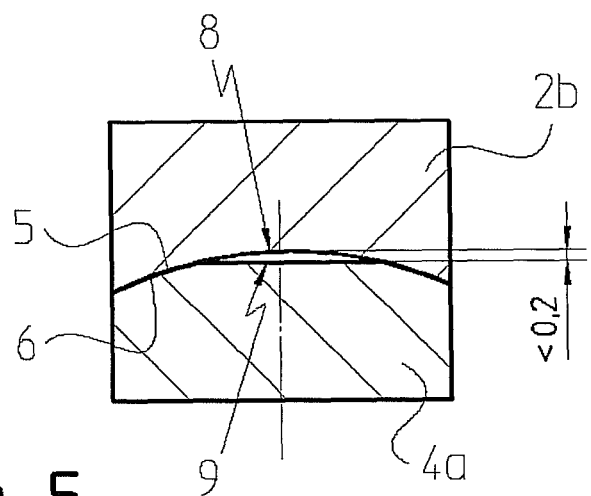
FIG. 5 is a detailed view pursuant to Section C according to FIG. 4.

As will be further understood by those of skill in the art following study of the description, the interaction between a surface section 9 with the respective internal surface 6 of the casing bore 7, results in a circle segment-like cross-section of the gap 8, as shown by detail C in the horizontal projection of FIG. 4 in FIG. 5. This circle segment-like cross section is arc shaped on one side and planar on the other. While a uniform plane 9 is shown, this invention also contemplates a broadened or narrowed plane (wedge shaped in either direction), or other non-linear milled plane surfaces (not shown).

As discussed in the current embodiment, these two gaps 8, 8 can be identified in particular in the longitudinal sectional view of Section B-B according to FIG. 3 and are respectively designed standard-compliant, i.e. at a height of 17 mm of the sealing element 4, for example, they have a width of 0.2 mm or less (shown by the illustrative extension lines for the gap "<0.2").

The sealing element 4 is produced as a plastic body from a thermoplastic, such as polyphenyline sulfide (PPS), by means of injection molding, or by any other suitable material, including ceramics, metals, and hardened glasses. During the manufacture of this sealing element 4, the connector pins 10 which are combined in the pin connectors 11 and 12 are also coated with plastic in this preferred embodiment.

The pin connector 12 projects beyond the front face 4b of the sealing element 4 into the casing interior 2a of the measuring cell 1, where it is connected with the pressure transducer 3 (as illustrated). During operation, the measuring signals of said pressure transducer are provided via the connector pins 10 into the pin connector 11 on the opposite front face 4a, which is connected to a measuring unit (not shown) that is operative to evaluate the measuring signals of the pressure transducer 3.

The sealing element 4 of the measuring cell 1 is designed as a plastic body such that its circumferential surface 5 has a maximum roughness of 3.2 μm.

Figure 7:
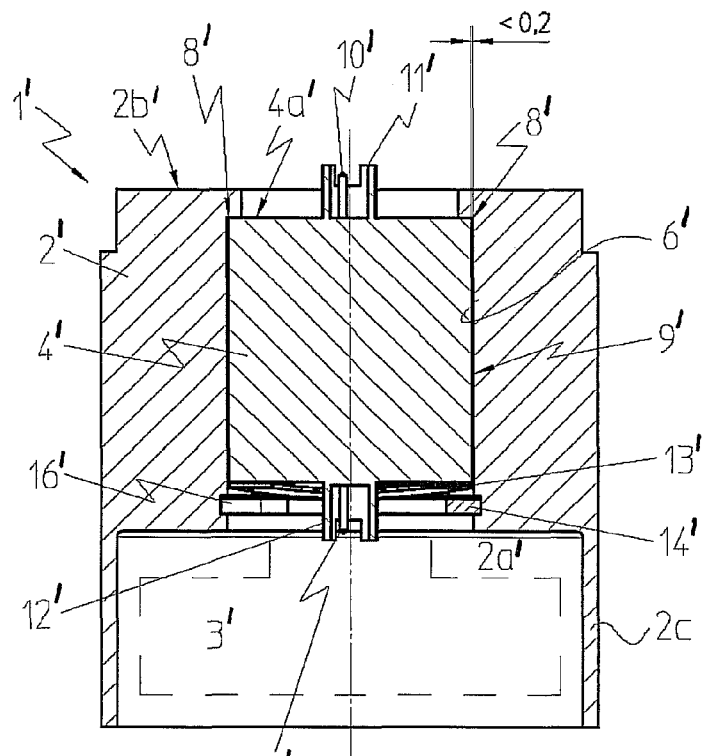
FIG. 7 is a cross-sectional view of a measuring cell with a cylindrical sealing element pursuant to the invention as a further embodiment.
Figure 8:
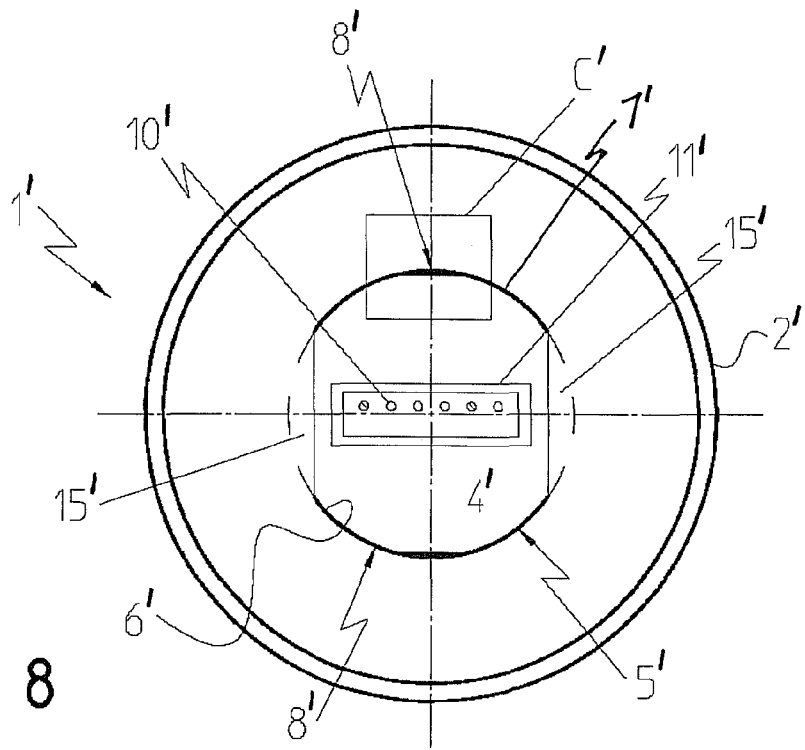
FIG. 8 is a frontal horizontal projection of the measuring cell pursuant to FIG. 7 and also noting a similarly positioned Section C for similar detailed consideration.

Referring additionally now to FIGS. 7 and 8, a measuring cell 1' with a casing 2', with a frontal outer surface 2b, in the casing interior 2a', in which there is also a sensor, such as a pressure transducer 3' (shown in dashed lines), is housed. The hollow cylindrical casing interior 2a' connects onto the casing bore 7', which is formed by a thin annular wall 2c'.

In place of a frusto-conical sealing element, a sealing element 4' with a cylindrical circumferential surface 5' is provided, wherein in adapting to this cylindrical sealing element 4' having a front face 4a', the casing bore 7' is designed as a cylindrical bore 7' with a cylindrical internal surface 6'. It is to be understood, that the illustration views of FIGS. 7-8 illustrate such cylindraceous surfaces, elements, and bores, as will be understood by ones of skill in the art.

In order to form a gap 8', in accordance with the sealing element 4' pursuant to FIG. 6 on the circumferential surface 5' of this cylindrical sealing element 4', two diametrically opposed strip-shaped and plane surface sections 9', 9' are provided, which respectively extend in the direction of the surface line of the cylindrical surface 5'. Together with the internal surface 6' of this cylindrical casing bore 7', these form surface sections 9', 9' as plane surfaces with respectively one gap 8' with a circle segment-like cross-section, corresponding to Detail C' of FIG. 8 represented also in FIG. 5.

In order to also be able to mount such cylindrical sealing element 4' in the likewise cylindrical casing bore 7', pursuant to FIG. 8, one or more segment-like abutments 15', 15' are arranged on the edge of the casing bore 7' are provided, so that when this sealing element 4' is introduced from the casing interior 2a' into the casing bore 7', it strikes and bears against segment-like abutments 15', 15'.

In the same manner, the sealing element 4' is held in this assembled position by a wave washer 13' and by a snap ring 14' clipped into a groove 16'.

The sealing element 4', same as the plastic injection molding, is produced from a thermoplastic material such as polyphenyline sulfide (PPS), wherein its circumferential surface 5' has a maximum roughness of 3.2 μm and connector pins 10' are co-molded at the same time and provided with corresponding pin connectors 11' and 12'.

Reference Numbers

1 Measuring cell
2 Casing
2a Casing interior
2b Frontal outer surface of the casing 2
2c Annular wall of the casing 2
3 Sensor, pressure transducer
4 Sealing element of the measuring cell 1
4a Front face of the sealing element 4
4b Front face of the sealing element 4
5 Circumferential surface of the sealing element 4
6 Internal surface of the casing bore 7
7 Casing bore
8 Gap
9 Surface section on the circumferential surface 5
10 Connector pins
11 Pin connector
12 Pin connector
13 Spring element, wave washer
14 Retaining element, snap ring
15 Abutment
16 Groove In the claims, means or step-plus-function clauses are intended to cover the structures described or suggested herein as performing the recited function and not only structural equivalents but also equivalent structures. Thus, for example, although a nail, a screw, and a bolt may not be structural equivalents in that a nail relies on friction between a wooden part and a cylindrical surface, a screw's helical surface positively engages the wooden part, and a bolt's head and nut compress opposite sides of a wooden part, in the environment of fastening wooden parts, a nail, a screw, and a bolt may be readily understood by those skilled in the art as equivalent structures.

Having described at least one of the preferred embodiments of the present invention with reference to the accompanying drawings, it is to be understood that the invention is not limited to those precise embodiments, and that various changes, modifications, and adaptations may be effected therein by one skilled in the art without departing from the scope or spirit of the invention as defined in the appended claims.

What is claimed is:

1. A measuring cell, comprising:
a casing operable for housing a sensor, preferably a pressure transducer;
said casing having a pressure compensation vent for said sensor;
said casing further comprising:
a sealing element having an axis-symmetrical circumferential surface;
said sealing element arranged proximate an interior surface of a casing bore of said casing formed complementary thereto;
said pressure compensation vent is formed as at least one gap between said sealing element and said casing bore;
said pressure compensation vent being operatively substantially resistant to ignition flashovers by interaction of a strip-shaped and plane surface section on the circumferential surface of the sealing element that extends along the casing bore proximate the internal surface of the casing bore.

2. A measuring cell, according to claim 1, further comprising:
at least two said gaps on the circumferential surface.

3. A measuring cell, according to claim 2, wherein:
said at least two gaps on said circumferential surface each include one plane surface section respectively provided diametrically opposite each other.

4. A measuring cell, according to claim 1, further comprising:
a clamping device is provided by which the sealing element is operatively held in its sealing position.

5. A measuring cell, according to claim 4, comprising:
a clamping device in the casing interior of the casing having a spring element, preferably a wave washer, to generate an urging contact force to press the sealing element into the casing bore; and
said claiming device further being effective as a retaining element, preferably a snap ring for retaining the spring element.

6. A measuring cell, according to claim 1, wherein:
said sealing element is frusto-conically shaped.

7. A measuring cell, according to claim 6, wherein:
a conically tapering front face of the sealing element is arranged on an outside region of said casing.

8. A measuring cell, according to claim 1, wherein:
said sealing element has a cylindrical shape.

9. A measuring cell, according to claim 8, further comprising:
at least one segment-like abutment on the outside of the casing proximate said casing bore effective to bear against the sealing element.

10. A measuring cell, according to claim 9, wherein:
a clamping device in the casing interior of the casing has a spring element, preferably a wave washer to generate an urging contact force to press the sealing element into the casing bore as well as a retaining element, preferably a snap ring for retaining the spring element.

11. A measuring cell, according to claim 1, wherein:
said sealing element is designed as a media-impervious contact bushing for passing through at least one connector pin.

12. A measuring cell, according to claim 11, wherein:
said sealing element is designed as a plastic body, preferably made of a thermoplastic synthetic material, in particular from polyphenyline sulfide (PPS).

13. A measuring cell, according to claim 12, wherein:
said sealing element is produced as an injection-molded plastic body.

* * * * *

UNITED STATES PATENT AND TRADEMARK OFFICE
CERTIFICATE OF CORRECTION

| | | |
|---|---|---|
| PATENT NO. | : 8,714,019 B2 | |
| APPLICATION NO. | : 13/325788 | |
| DATED | : May 6, 2014 | |
| INVENTOR(S) | : Kopp | |

It is certified that error appears in the above-identified patent and that said Letters Patent is hereby corrected as shown below:

On the Title Page item (73) the following correction should be made:

Assignee: Vega Greishaber KG, Wolfach (DE) should be--Vega Grieshaber KG, Wolfach (DE)--

Signed and Sealed this
Fifteenth Day of July, 2014

Michelle K. Lee
*Deputy Director of the United States Patent and Trademark Office*